Sept. 12, 1939.  H. KÜPPENBENDER ET AL  2,172,618
WEIGHING MECHANISM
Filed Dec. 13, 1937   3 Sheets-Sheet 1

Inventors
Heinz Küppenbender
Wilhelm Winzenburg
Atty.

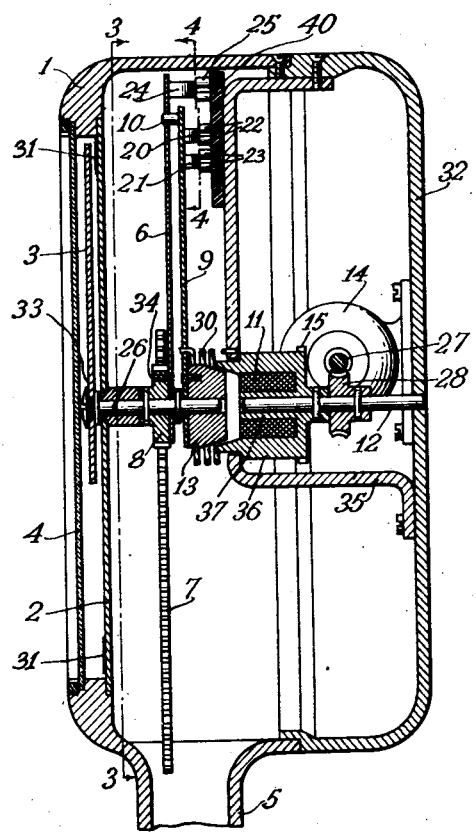
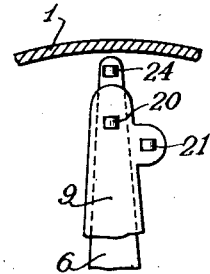
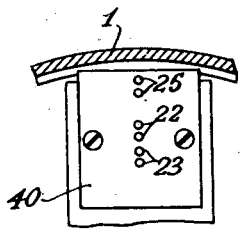

Inventors:
Heinz Küppenbender
Wilhelm Winzenburg
BY
B. Singer
Attorneys.

Patented Sept. 12, 1939

2,172,618

UNITED STATES PATENT OFFICE 2,172,618

WEIGHING MECHANISM

Heinz Küppenbender and Wilhelm Winxenburg, Dresden, Germany, assignors to Zeiss Ikon Aktiengesellschaft, Dresden, Germany Application December 13, 1937, Serial No. 179,426
In Germany October 15, 1936

4 Claims. (Cl. 234—5.4)

This invention relates to improvements in weighing mechanisms.

The invention has as general object to provide an accurately working indicator mechanism for a weighing machine adapted to register by means of a motor actuated recording device or in some other form the weights successively placed on the scale, and to place the scale and motor controlled device subsequent to each weighing operation in readiness for the next succeeding operation.

It is also an object of the invention to provide an indicator mechanism for weighing machines, in which a motor operates some ancillary mechanism, as for instance an adding or printing device, the operation of the motor being controlled by means of an indicator element after the load on the weighing machine has been fully indicated.

It is also an object of the invention to provide in combination with the indicator mechanism of a weighing machine a motor adapted to be energized for the operation of an adding or printing mechanism or the like, when the indicator of the weighing machine is in load indicating position, and to stop automatically the operation of the motor when the function for which said motor is combined with the weighing machine has been performed.

It is, furthermore, an object of the invention to provide in an indicator mechanism for a weighing machine in association with a motor, a clutch between the motor and an indicator operated member, whereby the motor operates said member which then controls the de-energization of the motor.

Another object of the invention is to provide a reliable indicator mechanism which can be produced accurately at low cost and which can readily be combined with any form of recording mechanism, a totalizer, printing mechanism or other motor driven device.

With these and numerous other objects in view, an embodiment of the invention is illustrated, by way of example, in the accompanying drawings; reference is made to these drawings in the following specification.

In the drawings:

Fig. 2 is a vertical central section through the dial housing and indicator mechanism;

Fig. 4 shows partly in elevation and partly in section, the arrangement of contact elements;

Fig. 5 shows partly in section and partly in elevation a mounting of stationary contact elements intended for cooperation with the contact members illustrated in Fig. 4;

Figure 1:
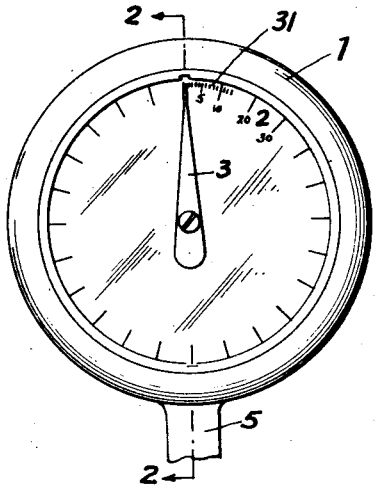
Fig. 1 is a front elevation of the indicator and dial of the weighing machine.

The weighing mechanism proper may be of any desired form. The assembly of the scale 10 levers, beams or of the load platform does not form a part of the present invention, and may be constructed in any desired way.

The indicator housing 1 is shown to be closed by the removable front plate 2, Fig. 2, having 15 the dial graduations 31, and in front of which the indicator 3 plays while being accessible to observation through the glass plate 4. This housing may be integral with a tubular post 5 which contains transmitting elements as for instance a rack bar 7 interposed between the weighing mechanism, not shown, and the indicator mechanism. The rear wall of the housing is formed by a removable cover 32. The actuation of the indicator or pointer 3 is effected through the rack bar in engagement with a pinion 8 which is fixedly secured to a shaft 26 to which the hub 33 of the pointer 3 also is fastened in some desirable way.

The indicator mechanism also comprises an additional indicator element rotatable conjointly with the pointer 3 and shaft 26, the latter being suitably supported in bearings, not shown. The additional indicator element 6 is shown as being secured to the pinion 8 by means of a screw 34 and this indicator element 6 also may have a form similar to that of the pointer 3 although it is obvious that it may be longer or shorter and may be of a slightly different form.

The two indicator elements 3 and 6 are, therefore, actuated conjointly and to the same extent and come to rest when the load positioned on the platform, not shown, is properly counterbalanced by the scale mechanism. For the present purposes it may be assumed that upon actuation of the rack bar 7 during weighing operation these indicator elements are rotated clockwise, Fig. 1.

As it is desired to effect additional operations with each complete weighing operation, as for instance, the totalizing of the weights successively positioned on the scale, or the printing of cards with weight indications, a motor 14 is secured to the cover 32 of the housing. This cover also is provided with a bracket 35 for supporting additional elements of the indicator mechanism. The operation of the motor 14 is to be initiated solely when the indicator element 3 is in proper load indicating position by manually closing a switch.

It is also obvious that the operation of the motor 14, whether it confines itself to the actuation of a recording or adding mechanism or whether it also serves for printing the record of the individual weights deposited on the scale shall cease after these functions are performed. And hence, the motor 14 also operates an element which irrespective of the location of the load indiating position of the pointer 3 interrupts the current supply through the motor 14 after the latter has functioned.

The operative rotation of the indicator element 6 induces a similar rotary movement of a member 9. This movement, in the device illustrated, takes place about the same axis about which the indicator element 6 is rotatable, a one-way clutch being provided for this purpose. The element 6 engages a projecting clutch pin 10 on the rotary member 9, when said element moves clockwise, Fig. 1.

When the pointer 3, and hence the auxiliary indicator element 6 have reached the position determined by the load on the scale and the member 9 also has been moved to the position controlled by the indicator element 6, the circuit for the motor 14 may be closed, as stated above, by an operator controlled switch. The closure of this switch, or the like, also will supply current to an electromagnet 11 within a cylindrical housing 36 having a hub 37 which is secured to a shaft 12 carried by the cover 32 in bearings, not illustrated in the drawings. The member 9 is provided with a hub 13 loosely supported on the shaft 26 of the indicator 3. The hub 13 constitutes an armature for the electromagnet 11, and upon energization of the latter, the hub 13 and member 9 will be shifted in axial direction, overcoming the action of the spring 30 interposed between the bracket 35 and the member 9. This spring normally has the function of projecting the clutch pin 10 of member 9 into a position for engagement with the auxiliary indicator element 6. The hub 13 of the member 9 is of such shape that upon being attracted by the electromagnet 11, this hub becomes a clutch member, the companion clutch member being formed by the housing 36 which is fixed to the shaft 12. If shaft 12 is rotated, the member 9 is then likewise rotated, the direction of rotation being such that the member 9 whose clutch pin 10 now is beyond the plane of the indicator element 6 is returned to its original position.

The motor 14 is in operative relation to the shaft 12 by means of a transmission comprising a worm 27 on the projecting end of the armature shaft and a worm gear 28 fixedly mounted on the shaft 12. Upon energization of the motor 14, therefore, the shaft 12 and the electromagnet 11 are rotated in a predetermined direction, and owing to the clutch engagement of the armature 13 with the electromagnet 11, the member 9 is rotated in a direction to its initial position.

In the embodiment illustrated, the housing 36 is provided with a gear rim 15 for engagement with a gear 29 which forms a part of the counting mechanism 50, whose indications may be observed through the window 17 in cover 32. This counting mechanism also may be provided with additional devices, as for instance, a printing device, the construction of which is here not of importance, so that the indications furnished by the pointer 3 at any specific weighing operation may be printed on a card that can be delivered from a housing 16 through the slot 19 when one of the push buttons 18 on the housing 16 is operated.

While the energization of the motor 14 is, therefore, under control of the operator of the scale, the de-energization of the motor is under automatic control of the member 9 actuated by the motor itself.

The motor 14 rotates said member 9, as for instance, clockwise, Fig. 4, and during the return movement of the same, a contact element 21 in the form of a resilient strip on member 9 comes into ontact relation with companion contact elements 23, whereby the supply of energy to the motor may be decreased, so that the motor from the time that the contact elements 21, 23 have entered into engagement with each other— the motor itself operates in braked condition. Upon continuing the operation of the member 9 with this retarded movement, another contact element 20 on said member enters into engagement with the stationary companion contact parts 22, thereby definitely short-circuiting the motor or in some other way cutting off the current supply to the motor, in such manner that the motor ceases to operate. The stationary companion contact elements 22 and 23, preferably are mounted on a plate 40 of insulating material secured to the bracket 35 which forms a part of the cover 32 of the housing. The movement of the member 9 in direction towards its original position takes place while the electric clutch comprising the elements 13 and 11 is still operative or energized. The plane of movement, therefore, of the member 9 when actuated by the motor is different from the plane of movement when the member 9 is operated by the auxiliary indicator element 6. The projecting clutch pin 10 also occupies a position to the rear of the plane of movement of the indicator element 6, which last named element during the movement of the motor 14 may remain in its operative or load indiating position.

When then the load is removed from the platform, the auxiliary indicator element 6 as well, as the pointer 3 automatically returns to initial position under the action of the weighing mechanism whose rack bar 7 actuates the pinion 8. In this return movement the auxiliary indicator element 6 passes beyond the tip of the projecting pin 10 of the member 9. When arriving at its original or zero position, a contact element 24 supported by the indicator element 6 enters into engagement with a stationary set of contact elements 25, likewise mounted on the insulating plate 40, and this engagement of the contact elements 24, 25 causes the electromagnet 11 to be de-energized, whereupon the member 9 through the action of the spring 30 is advanced from the plane in which the clutch 11, 13 is operative to the position illustrated in Fig. 2, in which the clutch 6, 10 is operative. In this last named position, the projecting pin 10 is again in the path of operative movement of the auxiliary indicator element 6, and the scale is ready for the next succeeding operation.

Figure 6:
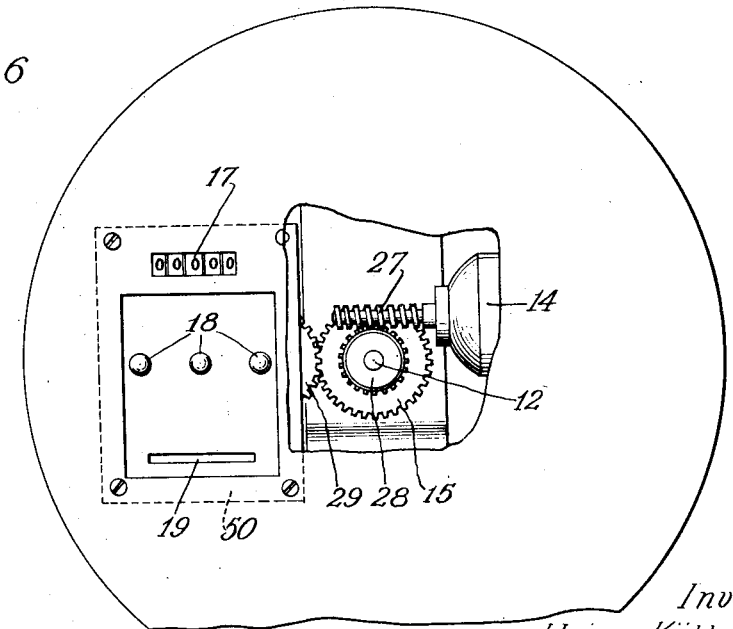
Fig. 6 is a rear elevation of the dial housing partly broken away to show the interior.

From Fig. 6 it will be observed that the window 17 of the counter is accessible for inspection either from the exterior of the cover 32 on the back wall of which this counter may be mounted and that a plurality of push buttons 18 is accessible to operation from the outside of the housing, which may be manipulated selectively for instance to illuminate the scale or for the purpose of inducing the discharge of a card on which the result of the weighing operation just performed may be printed, or for other purposes.

The electric equipment of the device is described in the following: It may be assumed that the device is fed from a source of alternating current through a transformer 38 whose primary winding is connected with the supply lines by a switch 39. A rectifier circuit 41 is interposed between the secondary winding of the transformer 38 and the relays forming part of the equipment. Upon closure of the switch 39 between the supply lines and the transformer, the relay $R_1$ is energized by a current flowing from the positive terminal 42 of the rectifier through the push button P, the line 43, the relay $R_1$, the line 44 to the contacts 25, 24, then closed because the indicator element 6 is in zero position, and back through the line 45 to the negative terminal 46 of the rectifier. The relay $R_1$ when energized will move its armature 47 away from the upper relay contact 48 and into engagement with the lower contact 49 thereby closing a holding circuit for the relay $R_1$. The holding circuit is formed by the positive terminal 42 of the rectifier, the push button P, line 43 to the relay $R_1$, the lower contact 49 of the relay, the armature 47 then attracted thereto, and the line 45 leading to the negative terminal 46 of the rectifier. The relay $R_1$, therefore, remains energized even after the indicator element 6 has moved away from zero position, thereby opening the contacts 24, 25.

The clutch solenoid 11 which had been momentarily energized while the armature 47 of relay $R_1$ was still in engagement with the upper contact 48 of the relay becomes deenergized upon the attraction of the armature 47 of this relay towards the lower contact 49.

The indicator element 6, therefore, moves to the indicating position in accordance with the weight placed on the platform, not shown, and positively pushes the member 9 to the same extent, the member 9, therefore, accompanying the indicator element 6 during its operative movement.

Figure 7:
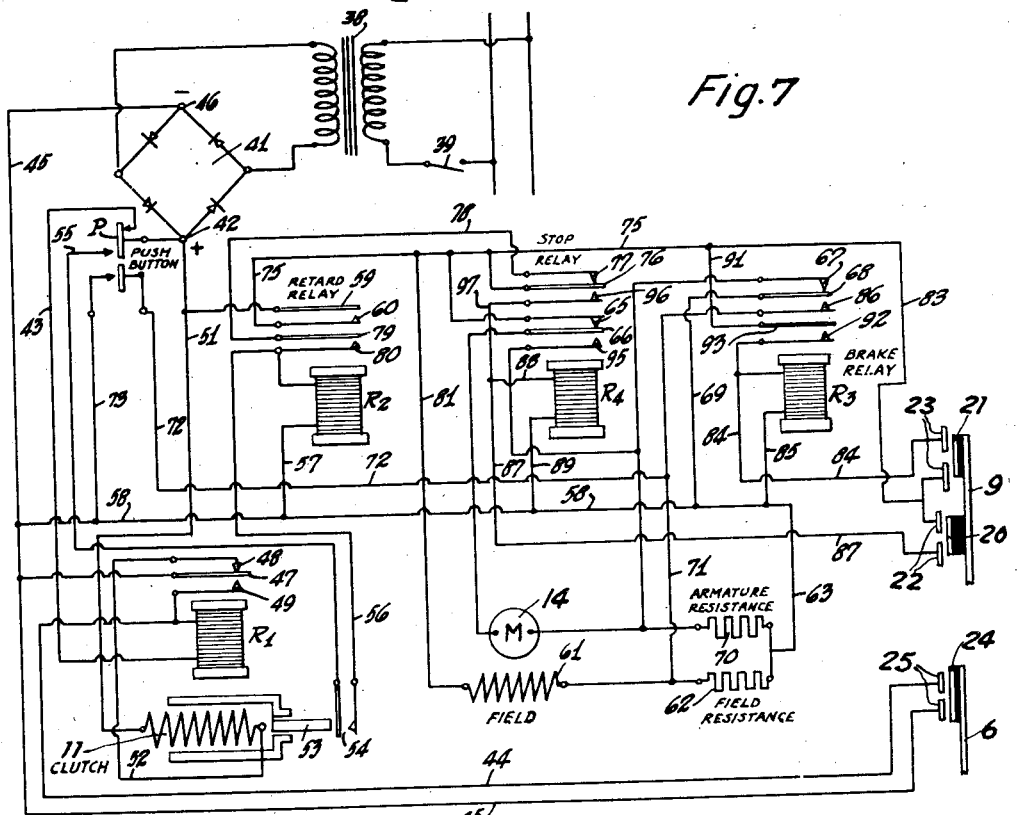
Fig. 7 is a circuit diagram to be used in connection with the weighing mechanism.
Figure 3:
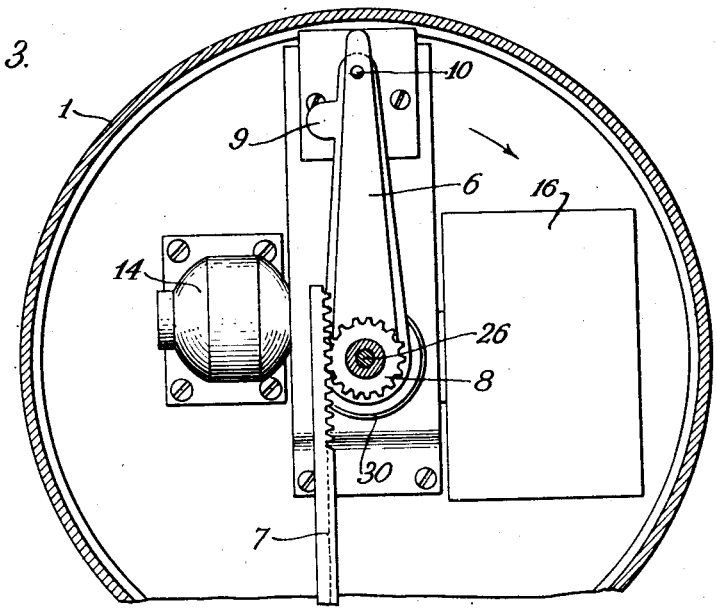
Fig. 3 is partly a sectional view and partly a front elevation of the indicator mechanism.

Upon depression of the push button P, upper section, the holding circuit through the relay $R_1$ is interrupted at the push button, whereby the clutch solenoid 11 now is energized through a current flowing from the positive terminal 42 of the rectifier through line 51, into the solenoid 11 of the clutch, line 52, the upper contact 48 and armature 47 of the relay $R_1$ and back through line 45 to the negative terminal 46 of the rectifier. The clutch 11 moves its core 53 to effect the closure of the contacts 54 shown in opposition to said core and in open condition in Fig. 7. The push button P now having been moved to a position different from that shown in Fig. 7, has closed a circuit containing the positive terminal 42 of the rectifier, line 55, contact elements 54—which are closed by the core 53 of the clutch—line 56, relay $R_2$, the lines 57, 58, 45 and the negative terminal 46 of the rectifier. The relay $R_2$ is energized thereby, and establishes its own holding circuit to remain energized after the release of the push button P. The holding circuit includes the positive terminal 42 of the rectifier, the upper armature 59 of the relay $R_2$, the contact 60 for said armature which is now closed, line 75, the upper armature 76 of relay $R_4$, contact 77, line 78, lower armature 79 of relay $R_2$, lower armature contact 80, relay $R_2$, and the line 57 to line 58. Another circuit is closed by the relay $R_2$ which includes the positive terminal 42 of the rectifier, upper armature 59 of relay $R_2$, contact 60, lines 75, 81, the field 61 of the motor 14, the field resistance 62 of said motor, and the lines 63, 58, 45 back to the negative terminal 46 of the rectifier. At the same time a current flows from the positive terminal 42 of the rectifier through the upper armature 59 and the contact 60 of the relay $R_2$, line 75, the lower contact 65 and armature 66 of the relay $R_4$ to the armature of the motor 14, through the upper closed contact 67 and armature 68 of the relay $R_3$, and through the lines 69, 58, 45 back to the negative terminal 46 of the rectifier.

It will be seen, therefore, that upon closure of the push button P, upper section, the field 61 with its field resistance 62 is connected in circuit as well as the motor armature the latter, however, not necessarily—as explained below—with the supplementary armature resistance 70, and the motor 14, therefore, is started. In order to impart a relatively great torque for starting to this motor, the operator also temporarily depresses the push button P, lower section, thereby eliminating the additional field resistance 62 of the field of the motor. The circuit shunting out the field resistance 62 of the motor is formed by the lines 71, 72, the push button P, lower section, and the line 73. By the depression of the push button P, lower section, therefore, the additional field resistance 52 of the motor is eliminated and the motor starts with relatively great torque. The clutch solenoid 11 having been energized by a current, whose continuance is solely dependent upon energization of the relay $R_1$, retains the solenoid contact 54 in closed condition. The motor, therefore, now actuates the supplementary member 9 which owing to the energization of the clutch 11 had been moved out of engagement with the indicator element 6. This member 9, therefore, is returned to its initial position, and during this return movement, the extent of which is dependent upon the extent of the movement of the indicating element 6 to indicating position, the motor also operates the counting mechanism, thereby entering into the counting mechanism values corresponding to the values to which the indicating element 6 had been positioned by the weight on the platform.

When the member 9 approaches its initial position, its contact 21 connects the contacts 23, thereby closing a circuit which energizes the brake relay $R_3$. This circuit includes lines 75, 83, contacts 23, line 84 relay $R_3$, and line 85 which is connected with line 58 leading back to the negative terminal 46. The relay $R_3$ upon energization eliminates the supplementary field resistance 62 from the field 61 by moving the upper armature 68 against contact 86, and owing to the movement of the upper armature 68 away from the contact 67 the armature resistance 70 is connected in series with the armature of the motor 14 since the resistance 70 is connected by line 63 with line 58. Owing to this change in the connections of the motor, the motor slows down the return movement. When the contact 21 leaves the contacts 23, just prior to closing the contacts 22 by its other contact 20, the relay $R_3$ remains energized by its holding circuit formed by the lines 75, 91, lower armature 93 of relay $R_3$, lower contact 92, relay $R_3$, and lines 85, 58. When then the member 9 reaches its initial position, its contact 20 closes the contacts 75

22 thereby energizing the relay R4, by the circuit 75, 83, contacts 22, line 87, 88, R4, 89, 58. This relay opening the circuit through the armature of the motor through the attraction of its lower armature 66 and short circuiting the armature of the motor by bringing the lower armature 66 in engagement with the contact 95. The attraction of the upper armature 76 away from the contact 77 also opens at this point the holding circuit for the relay R2 whose upper armature 59 is thereby restored to raised position, thereby opening the field circuit of the motor 14 at 60. The upper armature 76 when being attracted engages the contact 96 connected by line 97 with line 88, thus holding relay R4 energized until the circuit is opened by relay R2. Relay R3 will be deenergized the instant the armature 59 is raised from contact 60. The arm 6 when returning to its initial position engages with its contact 24 the stationary contacts 25, thereby closing the circuit through the relay R1. The latter attracts its armature 47 and thereby deprives the clutch solenoid 11 of current so that the parts are restored to their initial condition.

While one specific indicator mechanism has been described herein, it is obvious that the invention is not limited to this embodiment and that numerous modifications may suggest themselves within the scope of the claims appended hereto.

We claim:

1. In an indicator mechanism for weighing machines an indicator element, a member operatively connected with said indicator element and actuated by the latter during movement of said element to weight indicating position, a motor, means for disconnecting said operative connection between said indicator element and said member and coupling the latter to the motor, means for energizing said motor, the motor being adapted to return the member to initial position while the indicating element remains in indicating position, means under control of said member for deenergizing the motor when the member has reached its initial position, and means under control of the indicating element for disconnecting said member from said motor when the indicating element returns to initial position.

2. In an indicator mechanism for weighing machines, a pointer rotatable about a fixed axis, a member rotatable in a plane parallel to the plane of rotation of said indicator element, means on said member projecting into the plane of rotation of the indicating element and into engagement with the edge of the indicating element, whereby upon movement of said indicating element in a predetermined direction in its plane, said member is pushed in the same direction in its own plane, operator controlled means for moving said member out of engagement with said indicating element, a motor and means under control of the operator actuated element for energizing the motor and for coupling said member upon disengagement from the indicating element with said motor, means under control of said member for deenergizing the motor after the motor has moved said member to initial position, and means under control of the indicating element for releasing the coupling between said motor and said member when the indicating element has returned to initial position.

3. In an indicator mechanism for weighing machines, the combination of an indicator element rotatable about a fixed axis in accordance with the load to be weighed, a member rotatable about the same axis in a plane parallel to the rotation of the indicator element and movable by said indicator element by a pushing action when said indicator element rotates in its plane under the influence of a load to be weighed, a motor, a shaft driven by said motor, an electric clutch on said shaft, operator controlled means for energizing said clutch and for withdrawing said member from engagement with said indicator element and for energizing the motor, which returns through said shaft and clutch said member to its initial position, means under control of said member for deenergizing the motor when the member has returned to initial position, and means under control of the indicating element for deenergizing said clutch when the indicating element has returned to initial position.

4. In an indicator mechanism for weighing machines, the combination of an indicator element rotatable about a fixed axis under the influence of a load to be weighed, a member rotatable about the same axis, a projection on said member extending into engagement with the leading edge of the indicator element, whereby said member will be rotated about its axis in a plane parallel to the plane of rotation of said indicator element when said indicator element travels to indicating position, operator controlled means for moving said member out of the plane in which it traveled when actuated by said indicating element and for energizing a motor adapted to return said member in a third plane parallel to the plane of rotation of the indicator element to its initial position, means under control of the member for deenergizing said motor when said member has returned to initial position, and means operative upon return of the indicating element to initial position for moving said member to its first described plane of rotation into engagement with the indicating element in its initial position.

HEINZ KÜPPENBENDER.
WILHELM WINZENBURG.